(No Model.) 2 Sheets—Sheet 1.
F. SCHRADER.
WHEEL TIRE.
No. 466,577. Patented Jan. 5, 1892.
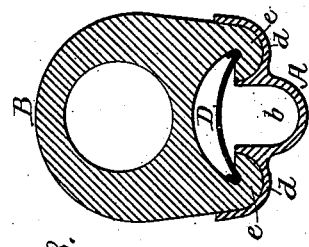
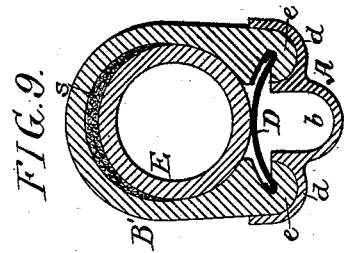
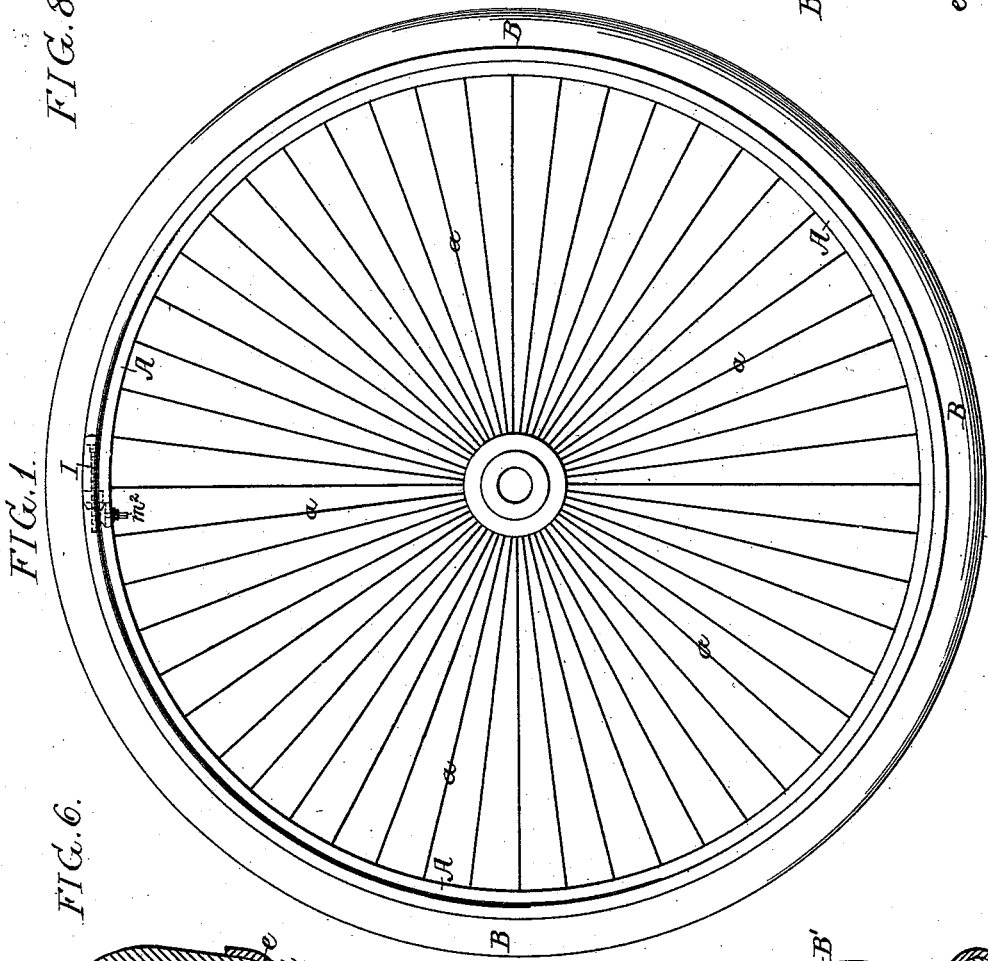
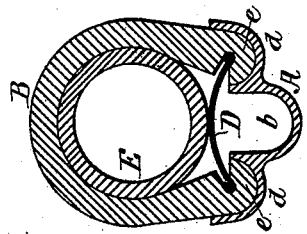
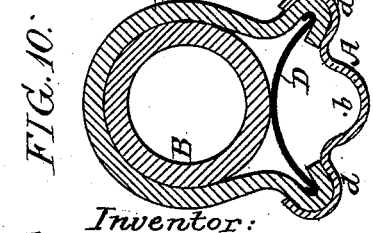
Witnesses:
R. Schleicher.
A. V. Groupe.
Inventor:
Frederick Schrader
by his Attorneys
Howson & Howson

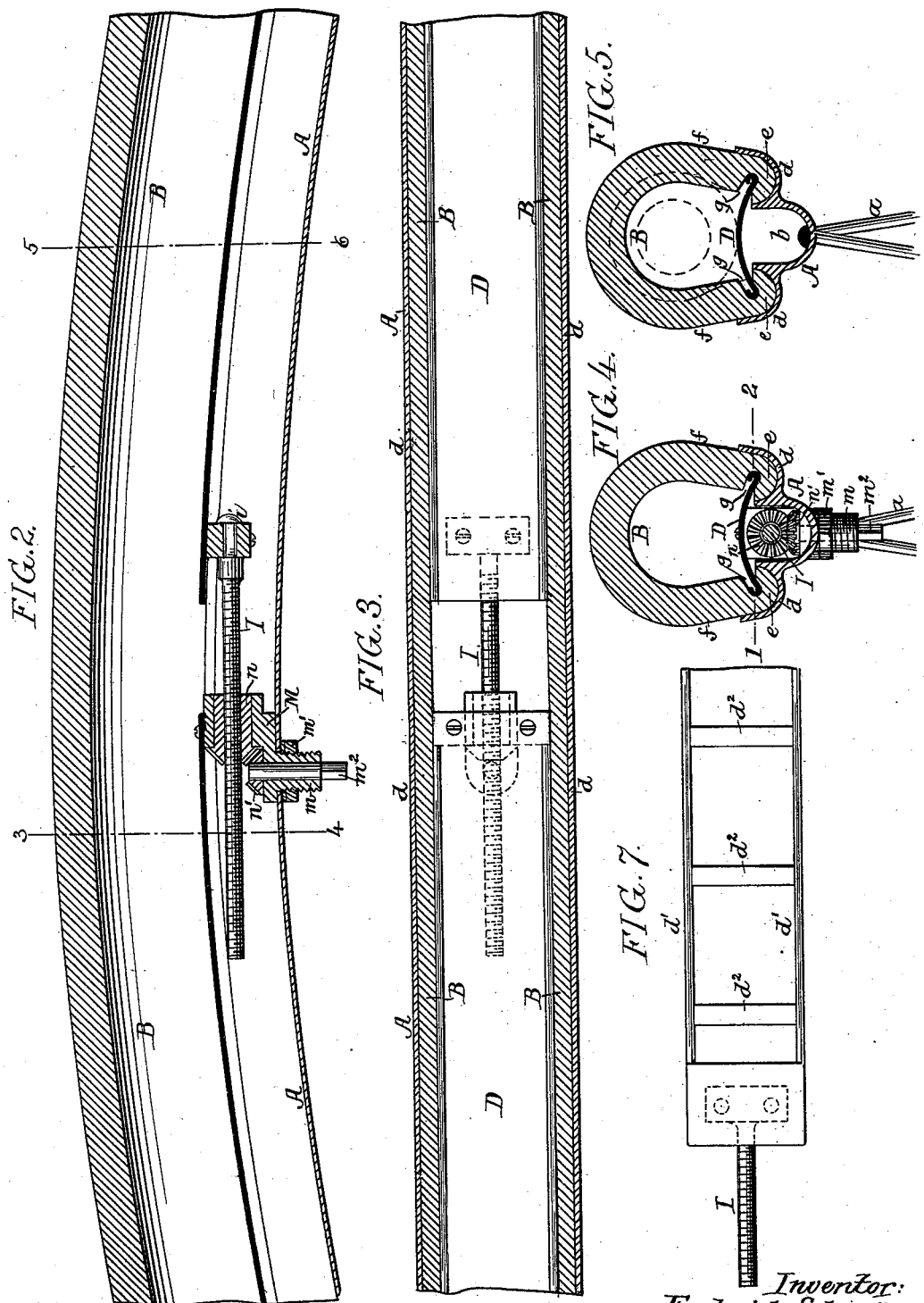
(No Model.) 2 Sheets—Sheet 2.
F. SCHRADER.
WHEEL TIRE.
No. 466,577. Patented Jan. 5, 1892.
Witnesses:
R. Schleicher.
A. V. Groupe.
Inventor:
Frederick Schrader
by his Attorneys
Howson & Howson

UNITED STATES PATENT OFFICE.

FREDERICK SCHRADER, OF PHILADELPHIA, PENNSYLVANIA.

WHEEL-TIRE.

SPECIFICATION forming part of Letters Patent No. 466,577, dated January 5, 1892.

Application filed December 30, 1890. Serial No. 376,249. (No model.)

*To all whom it may concern:*

Be it known that I, FREDERICK SCHRADER, a citizen of the United States, and a resident of Philadelphia, Pennsylvania, have invented certain Improvements in Wheel-Tires, of which the following is a specification.

The object of my invention is to provide a wheel with a flexible tire that can be readily and securely fastened to the wheel; and the further object of my invention is to use said flexible tire to retain an inflated section, or what is now commonly called an "inflated tire," dispensing with the usual cumbersome and complicated devices usually employed for retaining the inflated section on the wheel.

Referring to the accompanying drawings, Figure 1 is a side view of a cycle-wheel, showing my improvement. Fig. 2 is a longitudinal section of a portion of the wheel. Fig. 3 is a sectional plan view on the line 1 2, Fig. 4. Fig. 4 is a transverse section on the line 3 4, Fig. 2. Fig. 5 is a transverse section on the line 5 6, Fig. 2. Fig. 6 is a view illustrating the tire and the inflated section. Fig. 7 is a view of the modification of the retaining-band for the tire. Figs. 8, 9, and 10 are views illustrating modifications of my invention.

My invention is especially applicable to wheels of cycles, as it has been found that the rough jolting of the rider on rough roads is to a great extent lessened by the use of an inflated or hollow tire; but heretofore the tire has been attached to the wheel in a manner not altogether satisfactory.

Referring to the drawings, A is the felly of the wheel; a, the spokes, which are secured to the felly in a suitable manner. The felly A is preferably made, as shown in the drawings, with a central annular groove b, and with annular grooves d d on each side of the central groove, as shown in Fig. 4. This construction not only strengthens the felly, but the grooves d d are the pockets for the reception of the edges of the tire B. I will here state that the shape of the grooves d d conform to the shape of the tire, which may vary under certain circumstances. The tire B is made preferably in the form shown in Fig. 3, having in the present instance rounded edges e e, adapted to the grooves d d. On the inner side of each flange f f of the tire is an annular groove g, and adapted to this groove is a plate or band D, the edges of which fit snugly in the said grooves. I preferably convex the plate transversely, as shown in Fig. 4, so as to stiffen the same when tension is applied, as it will be understood that this band extends completely around the wheel and the two ends are secured together, thus making a rigid fastening for the tire. It will be understood that the band may be made in as many sections as is deemed necessary and can be provided with a like number of securing and tightening devices. On the small wheels a single band may be sufficient; but on very large wheels two or more sections of the band may be required. The edges of the band are, in the present instance, rounded to form smooth ribs, which will not cut the tire, as I prefer to make this tire of rubber or equivalent yielding material.

In Figs. 4 and 5 I have shown the tire having an equal thickness throughout; but this thickness may vary, as shown in Figs. 6 and 8, depending greatly upon its character and the use to which the wheel is put. At one end of the band D is a lug $i$, secured loosely, in which is a screw I. This screw cannot, however, turn in the lug, being loose simply to accommodate the nut on the opposite end of the band. Secured to the opposite end of the band is a bracket M, which is also secured to the felly A. A portion $m$ of this bracket passes through the felly and is secured thereto by a nut $m'$, as shown in Fig. 2. Thus one end of the band is a fixture, while the other end is movable. The nut $n$ has at one end beveled gear-teeth which mesh with the beveled gear-wheel $n'$, carried by the stem $m^2$, which passes through the portion $m$ and is adapted to receive a suitable key by which it is turned, so as to turn the nut on the screw and draw the two ends of the band toward each other. This mechanism for drawing the ends of the band together may be modified without departing from the main features of my invention.

To apply the tire to the felly of the wheel, the tire being in one piece, the band is expanded as far as necessary and adjusted to the grooves of the tire, and when the tire seats itself in the annular grooves $d\ d$ the band is tightened by the above-described mechanism, thus forcing the ends of the tire tightly into the grooves $d\ d$ and locking the tire firmly to the felly. I prefer to make the tire U-shaped in cross-section, as shown; but this shape may be slightly modified to accommodate the different uses to which the wheel is put. The tire may be inflated by simply forcing air under pressure into the space between the band and the tire; or, which is preferable, I place within this space a tubular inflated section E, Fig. 6, which may be a single annular tube or may be tube-sections, or in some instances a series of balls may be used, the tire B then acting as a retainer for the inflated section or sections. In some instances a packing $s$ may be placed between the tube and the tire, as shown in Fig. 9, which will prevent the cutting of the inflated section.

In Fig. 10 I have shown a flexible strip B', acting as a retainer for the inflated section in place of the formed tire, the strip acting to hold the section in place, at the same time shielding it.

In Fig. 8 I have shown the tire and tubular section combined.

In Fig. 7 I have illustrated a modification of the band. The band in this instance is made up of wires $d'$, tied together at intervals by braces $d^2$. This form of band can be used when lightness is a consideration.

I claim as my invention—

1. The combination of the felly of a wheel, a continuous U-shaped tire the edges of which are seated in said felly, a clamping-band located inside of but not filling the tire and pressing the edges of said tire down into the felly, and means for tightening said band, substantially as specified.

2. The combination of the U-shaped tire, the felly, an inflated tube confined by said tire, and an internal clamping device, between which and the felly the U-shaped tire is secured, substantially as set forth.

3. The combination of the tire, the felly, an inflated section, and a band gripping the tire and confining the inflated section of the felly through the medium of the tire, the band occupying a position between the inflated section and the felly, substantially as set forth.

4. The combination of the felly of a wheel, a continuous U-shaped tire the edges of which are seated in said felly, a clamping-band located inside of but not filling the tire and pressing the edges of said tire down into the felly, tightening-gearing for said band, and an operating-stem therefor at the back of the felly, whereby the band can be tightened without disturbing the tire, substantially as described.

5. The combination of the felly having annular grooves therein, a U-shaped tire adapted to said grooves, and a clamping-band adapted to bear upon the inner side of the tire and force it into the grooves, with mechanism for tightening said band, substantially as set forth.

6. The combination of the annular grooved felly, a tire having edges adapted to said grooves, slots in the inner edges of the flanges of the tire, a band adapted to said slot, and mechanism for tightening said band, substantially as described.

7. The combination of a felly, a tire adapted thereto, and a securing-band for said tire, one end of said band having a nut and the other end having a screw adapted to said nut, so that on turning the nut on the screw the tire will be released from or secured to the felly, substantially as described.

8. The combination of the felly, the tire-securing band therefor, a screw on one end of said band, a bracket on its opposite end fixed to the felly, a nut carried by said bracket and adapted to the screw, gear-teeth on said nut, and a spindle extending through the felly, carrying a wheel meshing with the teeth of the nut, so that on applying a wrench to said spindle the nut can be turned upon the spool, substantially as described.

In testimony whereof I have signed my name to this specification in the presence of two subscribing witnesses.

FREDERICK SCHRADER.

Witnesses:
HENRY HOWSON,
H. F. REARDON.